United States Patent [19]
Wicks et al.

[11] Patent Number: 5,351,053
[45] Date of Patent: Sep. 27, 1994

[54] ULTRA WIDEBAND RADAR SIGNAL PROCESSOR FOR ELECTRONICALLY SCANNED ARRAYS

[75] Inventors: Michael C. Wicks, Utica; Russell D. Brown, Holland Patent, both of N.Y.

[73] Assignee: The United States of America as represented by the Secretary of the Air Force, Washington, D.C.

[21] Appl. No.: 100,649

[22] Filed: Jul. 30, 1993

[51] Int. Cl.$^5$ .................. G01S 13/42; H01Q 3/22; H01Q 3/42

[52] U.S. Cl. .................. 342/158; 342/372; 342/81; 342/140; 342/202

[58] Field of Search ............ 342/158, 368, 371, 372, 342/73, 74, 81, 99, 132, 139, 140, 202

[56] References Cited

U.S. PATENT DOCUMENTS

| | | | |
|---|---|---|---|
| 3,434,139 | 3/1969 | Algeo | 343/778 |
| 4,160,975 | 7/1979 | Steudel | 343/16 M |
| 4,276,551 | 6/1981 | Williams et al. | 343/100 SA |
| 4,516,131 | 5/1985 | Bayha et al. | 343/785 |
| 4,520,361 | 5/1985 | Frazita | 342/372 |
| 4,670,756 | 6/1987 | Lopez | 342/372 |
| 4,683,474 | 7/1987 | Randig | 342/368 |
| 4,689,627 | 8/1987 | Lee et al. | 342/373 |
| 4,739,334 | 4/1988 | Soref | 342/368 |
| 4,749,995 | 6/1988 | Hopwood et al. | 342/371 |
| 4,827,229 | 5/1989 | Sabet-Peyman et al. | 333/187 |
| 4,861,158 | 8/1989 | Breen | 356/5 |
| 4,868,574 | 9/1989 | Raab | 342/81 |
| 4,912,474 | 3/1990 | Paturel et al. | 342/191 |
| 5,111,208 | 5/1992 | Lopez | 342/174 |
| 5,146,616 | 9/1992 | Tang et al. | 455/103 |
| 5,239,309 | 8/1993 | Tang et al. | 342/13 |

*Primary Examiner*—John B. Sotomayor
*Attorney, Agent, or Firm*—William G. Auton; Stanton E. Collier; Jacob N. Erlich

[57] ABSTRACT

A radar system that includes an ultra wideband radar signal processor for electronically scanned arrays that utilizes frequency offset generation (FOG) to achieve beam steering as compared with phase shift and time delay techniques of conventional radars. The device comprises a transmit antenna, a chirp generator connected to the transmit antenna and a first summing circuit, a receiver antenna connected to the first summing circuit, a Doppler de-ramping chirp circuit connected to a second summing circuit, the output of the second summing circuit connected to an amplitude and weighting circuit and the output of the amplitude circuit connected to a spectrum analyzer of a Fast Fourier Transform (FFT) circuit. The signal processing consists of mixing the target returns with the transmitted signal to obtain a video beat note signal. This video beat note signal is mixed with a Doppler de-ramping chirp waveform which is matched to the desired target velocity. The output is amplitude weighted and the FFT algorithm applied. To achieve beam steering for the detection of off boresight targets, a phased array with distributed receivers is required. Also, frequency offset generation must be incorporated into the Doppler de-ramping chirp generator.

4 Claims, 8 Drawing Sheets

ULTRA WIDEBAND RADAR SIGNAL PROCESSOR FOR ELECTRONICALLY SCANNED ARRAYS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to radar tracking systems, and more specifically the invention pertains to a signal processor for use with the multioctave ultra-wideband radar tracking systems.

Electronically scanned phased arrays are replacing mechanically scanned reflectors for modern radar applications. New design problems and new beam agility requirements arise due to the modern target threat. The trend toward increasing waveform bandwidth in radar further complicates this radar design problem. It should be noted that phase shift techniques for beam steering are applicable to phased array radars employing waveform modulation bandwidths of less than one percent. For larger bandwidth waveforms, true time delay techniques are used. Broadband systems which require many beam positions will require a large number of time delay lines and microwave switches. Also, the corporate feed loss of such a beamforming system will be excessive, and will vary with frequency, thus causing signal distortion and reduced radar sensitivity. Therefore, for ultra wideband radar waveforms, with an octave bandwidth or more, true time delay techniques are also inadequate.

The technique of electronically steering a narrow-band radar beam by adjusting the phase of adjacent radiating elements is described in the text "Introduction to Radar Systems" by M. Skolnik, the disclosure of which is incorporated herein by reference. A change in relative phase between adjacent elements may be obtained by a change in frequency. This principle can be used to scan a beam from an array if the phase shifters are frequency-dependent. A frequency-scanned antenna might be represented by a series-fed array with fixed lengths of transmission line connecting the elements. The total phase delay through a fixed length l of transmission line is $2\pi fl/c$, and thus is a function of the frequency f. The lines connecting adjacent elements of the series-fed frequency-scanned array are of equal length and chosen so that the phase at each element is the same when the frequency is the center frequency $f_o$. When the frequency is exactly $f_o$ the beam points straight ahead. As the frequency is increased above $f_o$, the phase through each length of transmission line increases and the beam rotates to one side. At frequencies below $f_o$ the beam moves in the opposite direction.

The technique of frequency scanning to electronically steer a radar beam is particularly important in ultra-wideband radar systems. Examples of the use of frequency scanning radar systems are discussed in the following U.S. Patents, the disclosures of which are specifically incorporated herein by reference:

U.S. Pat. No. 4,912,474 issued to Paturel;
U.S. Pat. No. 4,868,574 issued to Raaab;
U.S. Pat. No. 4,827,229 issued to Sabet-Peyman;
U.S. Pat. No. 4,516,131 issued to Bayha;
U.S. Pat. No. 4,276,551 issued to Williams et al;
U.S. Pat. No. 3,434,139 issued to Alego;
U.S. Pat. No. 4,160,975 issued to Steudel;
U.S. Pat. No. 4,683,474 issued to Randing; and
U.S. Pat. No. 4,861,158 issued to Breen.

Both frequency and phase scanned antennas are well known in the art. Frequency scanned antennas have the advantages of simplicity and low cost. The patent to Steudel teaches a correction circuit or using the sum and difference signals in wideband antenna system to increase azimuth and elevation accuracy. The patent to Randing teaches a ground base sensor comprising a plurality of unconnected sub-arrays, a wideband receiver matched filter bank, envelope bank selectors, a summing network and a target detector. The patent to Breen teaches a device for performing a doppler shift measurement with a chirp measurement with a chirp frequency laser signal.

Conventional radar technology implies systems utilizing waveforms with modulation bandwidths of up to 2%, while modern wideband radar systems utilize bandwidths of less than 25% Present research and development efforts involve expanding bandwidths into ultra-widebands as follows.

Typical radar systems transmit waveforms with frequencies selected from a range of between 300 $MH_z$ to 40 $GH_z$. In most case the radar systems include a single band device. That is, the system operates on only one frequency band. Thus, two (or more) array apertures are required in order to radiate and receive multiband radar waveforms. In the past, this has caused the multifrequency systems to have multiple apertures with the attendant increase in cost, weight, size and the like. Thus, these systems have been disadvantageous for utilization in many applications.

The task of utilizing ultra-wideband radar frequency is alleviated, to some extent, by the system disclosed in the U.S. Pat. No. 4,689,627 issued to Lee et al., the disclosure of which is incorporated herein by reference.

The above-cited Lee et al. reference discloses an ultra-wideband radar system which can operate over approximately an octave bandwidth encompassing, for example, both S-band and C-band. The present invention can make use of the Lee et al. system to transmit a multioctave chirp waveform in a process which eliminates range-doppler ambiguities.

For multi-octave bandwidth radar systems employing frequency modulated waveforms, the present invention solves the problems associated with beamforming and beam agility. The present invention utilizes phased array antenna technology, receivers on each antenna element, and baseband frequency offset generation techniques, thus eliminating corporate feed losses and signal distortion. Also, the present invention provides for the generation of multiple beams, which is required for many modern radar applications.

SUMMARY OF THE INVENTION

The present invention includes a radar signal processor system for electronically steering ultra-wideband radar systems by frequency offset generation. This invention can be used with the above-cited AF Invention No. 18,309 as discussed below.

A beam can be steered by adjusting the phase of the radiating elements. Adjustments in phase can be accomplished by changes in the length of the transmitting cables. If a cable is increased in length by a distance which equals one half the wavelength of the transmitted signal, then the transmitted signal is retarded by a phase shift of 180 degrees. The present invention accomplished beam steering by adjusting the wavelength and frequencies of the transmitted signals, rather than the physical length of the transmitting cables or other methods of achieving true time delay.

In one embodiment of the invention, a transmitting planar array uses frequency offset generation between adjacent X and Y elements to electronically steer the transmitted beam in azimuth and elevation. Chirped pulse sets are transmitted in ultra-wideband frequencies to resolve Doppler-shift ambiguities as described in the Van Etten et al. reference.

The present invention uses a planar array of receiver antenna elements to detect the angle of arrival of reflected signals by frequency offset. The frequency offset between X and Y elements can indicate the azimuth and elevation from which the radar signals have come. The radar receiver includes an improvement upon the signal processing system of AF invention No. 18,309 to resolve Doppler-shift ambiguities as described below.

AF Invention No. 18,309 includes an FM-CW radar with a Doppler chirp compression filter. This radar system includes: a chirp pulse generator, a transmitting radar antenna, a radar receiving antenna, two mixers, a frequency offset generator and a Doppler deramping chirp signal generator, and amplitude weighting amplifier, and a spectrum analyzer.

The chirp pulse generator is a waveform generator that produces an ultra-wideband chirp pulse shown in FIG. 1, which is radiated out through the transmitting antenna to the target. A Doppler-shifted chirp pulse is reflected off the target and received by the receiving antenna.

The first mixer mixes the ultra-wideband chirp pulse, which it receives from the chirp pulse generator, with the Doppler-shifted chirp pulse (which is received from the receiving antenna,) to produce thereby an output signal known as a video beat note. The beat note indicates the range of the target by virtue of the delay between the transmitted pulses and the received pulses. See FIGS. 7 and 8.

The second mixer produces an output signal by mixing the video beat note (from the first mixer) with a Doppler deramping chirp (from a signal generator). See FIG. 8. The output signal of the second mixer is then amplitude weighted by the amplifier to reduce sidelobes, and then sent to the spectrum analyzer for conventional data analysis. The data processor determines the target's velocity, range and position.

As mentioned above, the present invention uses frequency offset generation to electronically steer the ultra-wideband beam of AF Invention No. 18,309. See FIG. 10. To point the mainbeam, the local oscillator input is selected to have a frequency given by $f_\Delta$. When the input $f_\Delta$ is sent to the first mixer of said ultra-wideband radar system, the mixer frequency output will be $\Delta f_o$.

The mixing of the transmitted signals with received target echo return signals produces a beat frequency signal. Additionally, the transmitted signal is back scattered from desired targets, received, and converted to baseband through homodyne receiver down conversion.

The transmitted signal is combined with the received signal to produce an antenna pattern of radiation in the desired azimuth. Beamsteering is accomplished by incremental differences in frequency between radiating elements given by:

$$f_\Delta = \Delta f_i - \Delta f_o = i 2 \eta d \sin(\theta)/c$$

where $\Delta f_o$ is the beat frequency signal output of the mixer;

C is the speed of light; equals the slope of the transmitted waveform, $\theta$ is the desired angle to which the beam is to be steered along one dimension;

$\eta$ equals the slope of the transmitted waveform $\eta = B/T$ d equals the distance between radiating elements on the array; and $f_i$ equals the frequency offset from $\Delta f_o$ for the $i^{th}$ antenna element where i equals an integer given by the sequence i=1,2, . . . N and N equals the total number of radiating elements in the array.

Steering the beam in two dimensions is accomplished by implementing the frequency offset between adjacent horizontal elements (to steer the beam in a azimuth) and by implementing the frequency offset between adjacent vertical elements (to steer the beam in elevation). When the transmitting antenna is a planar array of radiating elements, the horizontal elements are rows of elements which are parallel with the ground, and the adjacent vertical elements refers to a vertical column of elements in the array.

It is the object of the present invention to provide a method for electronically steering an ultra-wideband radar tracking system.

It is another object of the present invention to use frequency offset generation with signal processing to reduce Doppler-shift ambiguities in ultra-wideband radar systems.

These objects together with objects, features, and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes an ultra-wideband radar signal processor for electronically scanned radar systems. As an introduction to this invention, the narrow band linear frequency modulated (LFM) waveform is discussed, and processing techniques for this invention are described.

When a radar target is illuminated with a continuous wave (CW) single frequency electromagnetic waveform, the reflected energy is shifted in frequency proportional to the targets velocity (V) and inversely as the carrier's wavelength $\lambda = c/f$ where f is the carrier frequency. The shift in frequency, $f_d$ is called the Doppler frequency, which is given by $$f_d = 2Vf/c.$$

Figure 1:
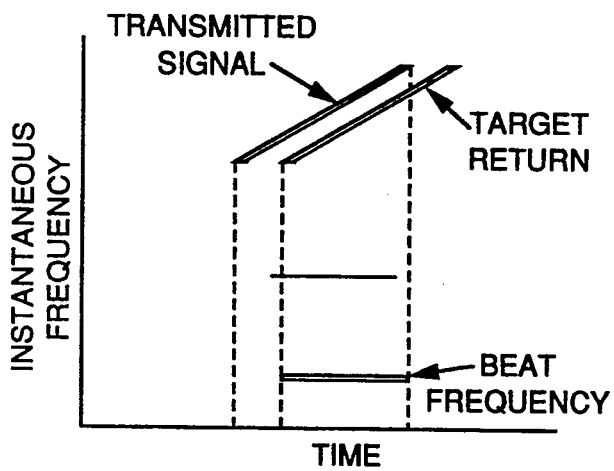
FIG. 1 is a chart of the instantaneous frequency vs. time which shows the relationship between: a transmitted signal, a target return signal, and beat frequency signal.
Figure 2:
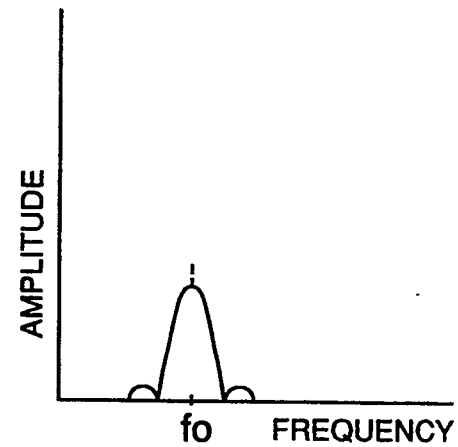
FIG. 2 is a chart of the spectrum of a target's beat note from a mixer output.

Consider a radar system radiating a linear frequency modulated waveform where the target return is mixed with the transmitted waveform to obtain a constant beat frequency as seen in FIG. 1. The frequency of the beat note, $\Delta f_o$, due to range delay is $\Delta f_o = \eta t_o$. Where $\eta$ is the slope of the transmitted waveform in Hz/s, and $t_o$ is the time delay of the target return in seconds. By performing a Fourier transform of the mixer output, the center frequency of the beat note becomes proportional to the target range. Using $R_o = ct_o/2$ where c is the velocity of light and $R_o$ is the target range then $\Delta f_o = 2\eta R_o/c$. Note that the slope of the transmitted waveform is $\eta = B/T$, where B is the bandwidth and T is the duration of the transmitted signal. The beat note can be expressed as $\Delta f_o = 2B R_o/(cT)$. Its spectrum is seen in FIG. 2. The range resolution, $\Delta R$, for linear frequency modulation is $\Delta R = c/(2B)$. Substituting, and rearranging terms $\Delta f_o = (R_o/\Delta R)(1/T)$. When the target is moving, the Doppler frequency offset due to target motion will appear in the beat note as an additional term. The radar system radiates and receives a linearly frequency modulated waveform. The additional Doppler frequency offset due to target motion will vary with instantaneous frequency as well as target velocity, $f_o = 2BR_o/(cT) + (2V/c)f$. However, this will not impact the performance of the beamsteering method and system described herein. The principle of operation of the invention depends upon the difference in beat note frequency from each receiver (one on every receive element) in a phased array, due to the spacing between elements and radar parameters, not due to target characteristics such as range or velocity, which can be accounted for independent of the beamforming process.

Consider the multi-octave bandwidth Linear Frequency Modulated Continuous Wave (LFM-CW) waveform utilized in AF Invention 18,309, (An Unambiguous Range-Doppler Processing Method and System). The beamforming network described herein is used in a multioctave bandwidth LFM-CW radar to electronically steer a phased array antenna main beam by processing the received signal at baseband. This is accomplished using Frequency Offset Generation (FOG) techniques as compared to phase shift and true time delay techniques in conventional radar.

Figure 3:
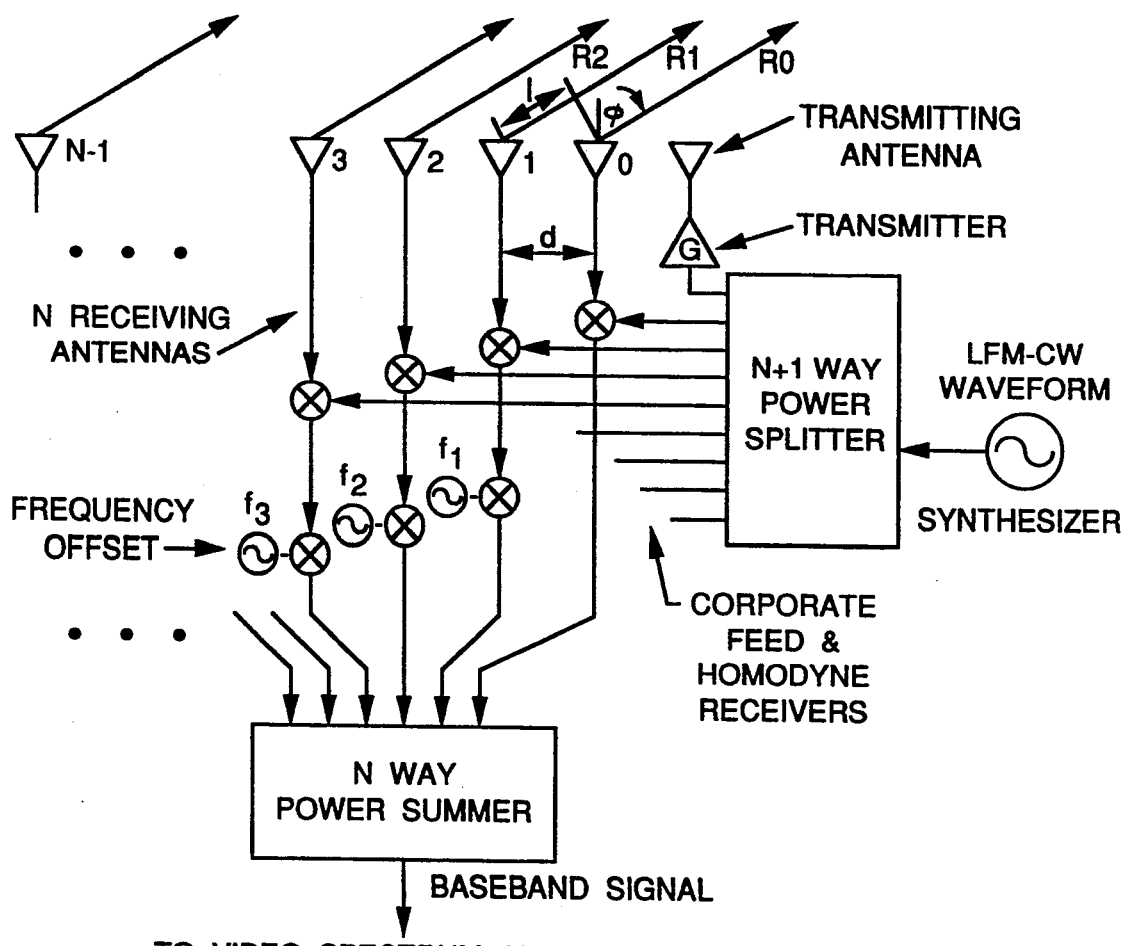
FIG. 3 is a block diagram of a realization of the ultra wide-band radar signal processor for electronically scanned arrays.
Figure 4:
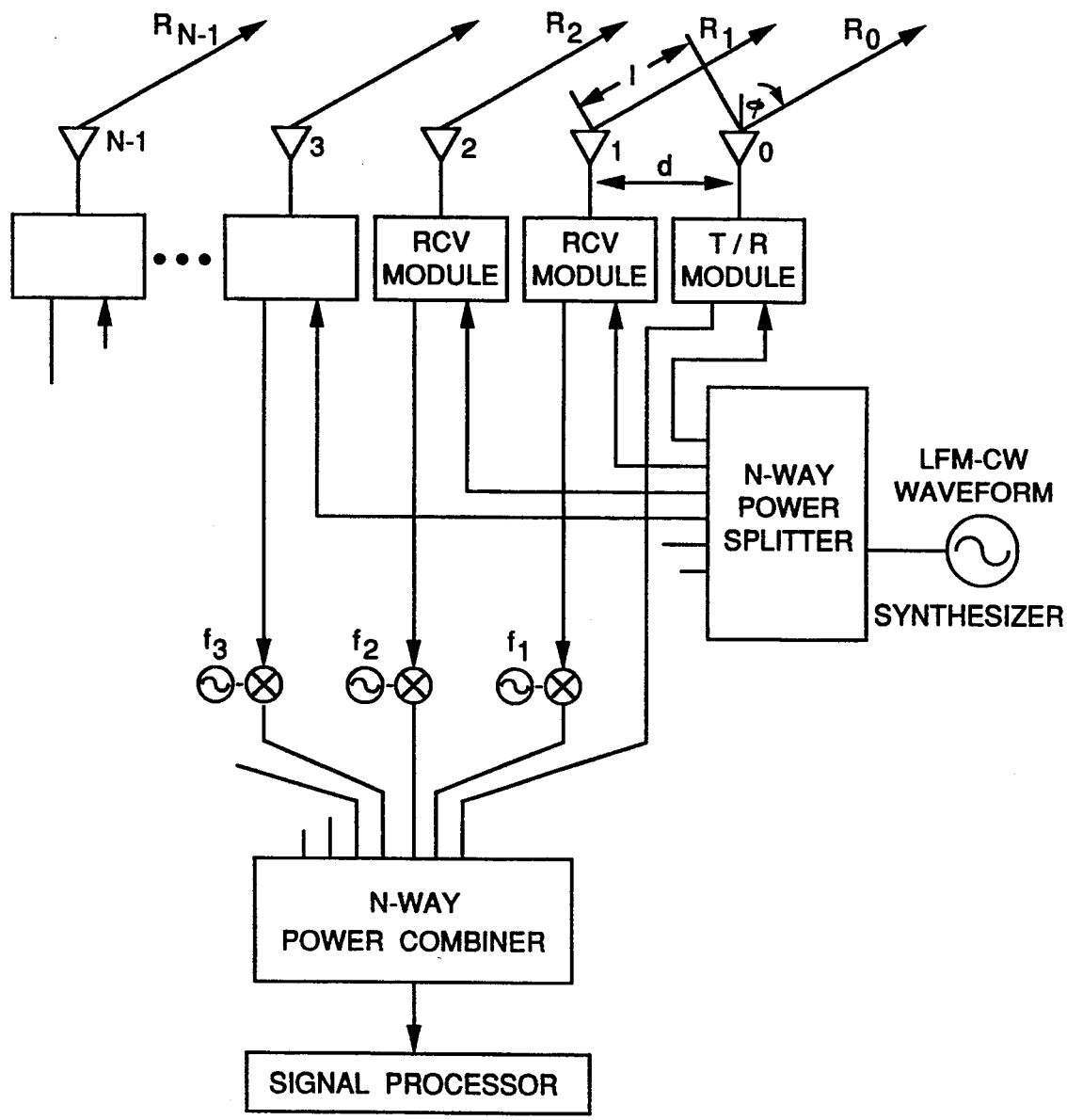
FIG. 4 is a block diagram of the ultra wide-band radar signal processor for electronically scanned arrays, using transmit/receive (T/R) modules and receive (RCV) modules.
Figure 5:
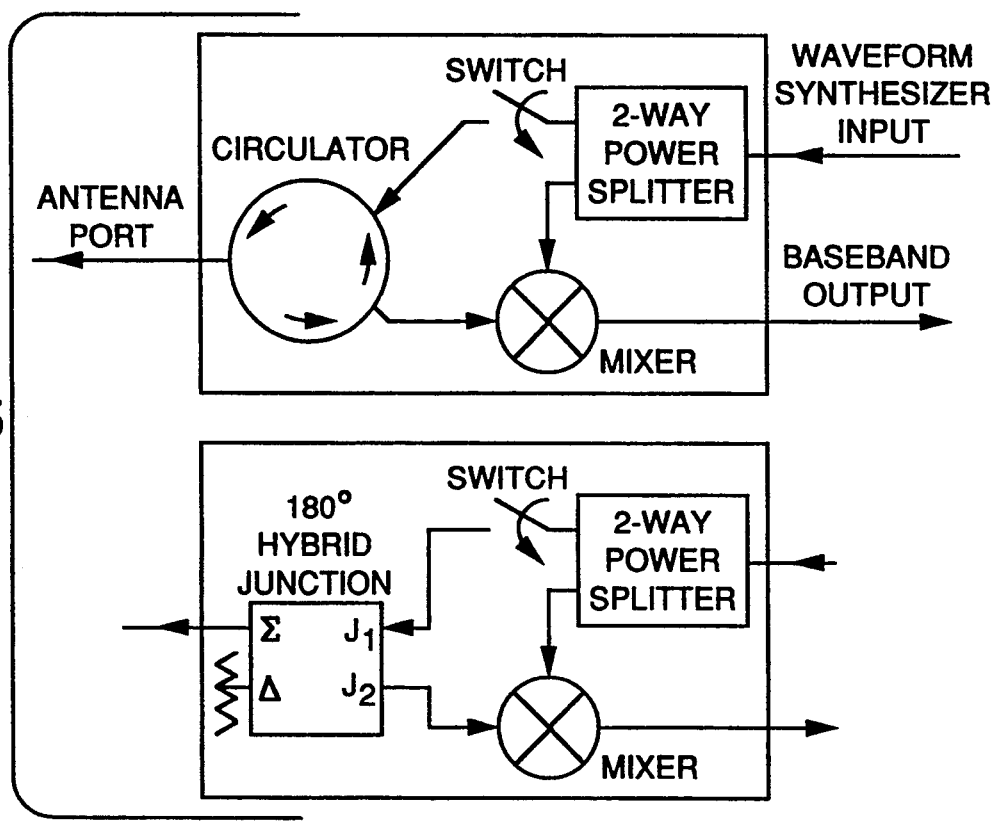
FIG. 5 is a block diagram of two state-of-the-art transmit/receive (T/R) modules.

In developing the theory of operation, consider the system in FIG. 3, and a point target in the far field (not shown), such that rays $R_o$ through $R_{N-1}$ are parallel. In this example, the waveform synthesizer generates an LFM-CW signal of bandwidth B and duration T. The waveform slope is $\eta = B/T$, and the range resolution is $\Delta R = c/(2B)$. The path length difference, between two consecutive parallel rays ($R_i$ and $R_{i+1}$), to a target at angle $\theta$ is given by $l = d \sin(\theta)$, where d is the spacing between consecutive elements. In this example, we will consider $l > \Delta R$. Through the use of multioctave bandwidths signals, we suppress grating lobes and achieve beam sharpening. For illustrative purposes, the range from the ith element to the target is constrained such that $R_i < < c/T2$ allowing the use of a homodyne receiver and time expansion correlation processing, although other receiver designs may be utilized.

In this first example there is one transmit antenna and N receive antennas. The analysis is performed with the transmit antenna placed at the same location as receive antenna O, which is a distance $R_o$ from the target. The transmitted signal is backscattered from desired targets, received, and converted to baseband through homodyne receiver down conversion. The path length from the ith receive antenna element to the target is $R_i = -R_o + il$, for $i = 0 \ldots N-1$. First, consider only antennas 0 and 1. The baseband difference frequency appearing at the output of the homodyne receiver following antenna 0 is $\Delta f_o = (R_o/\Delta R)(1/T) + (2V/c)f$. The baseband difference frequency from the homodyne receiver following antenna 1 is given by $\Delta f_1 = (R_1/\Delta R)(1/T) + (2V/c)f = (R_o + l)/\Delta R)(1/T) + (2V/c)f = \Delta f_o + l/(\Delta R T)$. The incremental difference frequency between elements will be designated $f_\Delta = \Delta f_1 - \Delta f_o = 1/(\Delta R\ T)$ which also may be represented as $f_\Delta = 2\eta d \sin(\theta)/c$. To point the mainbeam of the two element phased array antenna toward a target at an angle $\theta$, we select the local oscillator input to the lower sideband mixer (the mixer following the homodyne receiver/antenna 1) to be $f_\Delta$, which produces a mixer frequency output of $\Delta f_o$. Thus the homodyne receiver output from antenna 1, after frequency offset generation (mixing with offset frequency $f_\Delta$) is at the same frequency as the baseband signal from the homodyne receiver following antenna 0. The two signals are then coherently combined to produce an antenna pattern with the mainbeam in the desired direction, $\theta$. This method of coherent summation may be extended to the N-element receiving array by placing a lower sideband mixer at the output of each homodyne receiver, and setting the incremental frequency offset between consecutive elements equal to $f_\Delta$. The frequency offset in the ith channel, which is fed to the mixer following the homodyne receiver on the ith antenna is then given by $f_{\Delta i} = if_\Delta = i(2\eta d \sin(\theta)/c)$. In the event that the selection of produces a negative frequency offset, the upper sideband mixer product must be selected.

A novel and important feature of the invention presented, is that frequency offset generation techniques are utilized to achieve beamsteering when using large bandwidth frequency modulated waveforms, (as compared to phase shift or true time delay techniques in conventional radars).

The system of FIG. 3 can be used to steer the transmitted beam electronically by frequency offset generating as described above. To point the main beam signals from the antenna, local oscillators are provided with individual frequency difference $f_{\Delta i}$ to the $i_{th}$ antenna element in the array. The incremental frequency difference between elements is designated as:

$$f_{\Delta i} = \Delta f_i - f_o = 2\eta d \sin \theta / C.$$

In the above cited equation, d represents the spacing between antenna elements and $\theta$ is the angle in azimuth to which the beam is to be steered. This equation defines a frequency difference between adjacent horizontal elements to steer the beam in azimuth. Note that the same frequency offset principles can be used to steer the beam in elevation when the frequency offset between vertical elements is defined as:

$$f_{\Delta i} = \Delta f_i - f_o = 2\eta d \sin \theta / C$$

where $\theta$ is the elevation angle toward which the beam is to be steered.

A planar array of transmitting elements can be steered electronically in two dimensions by frequency offset generation as described above.

Figure 8:
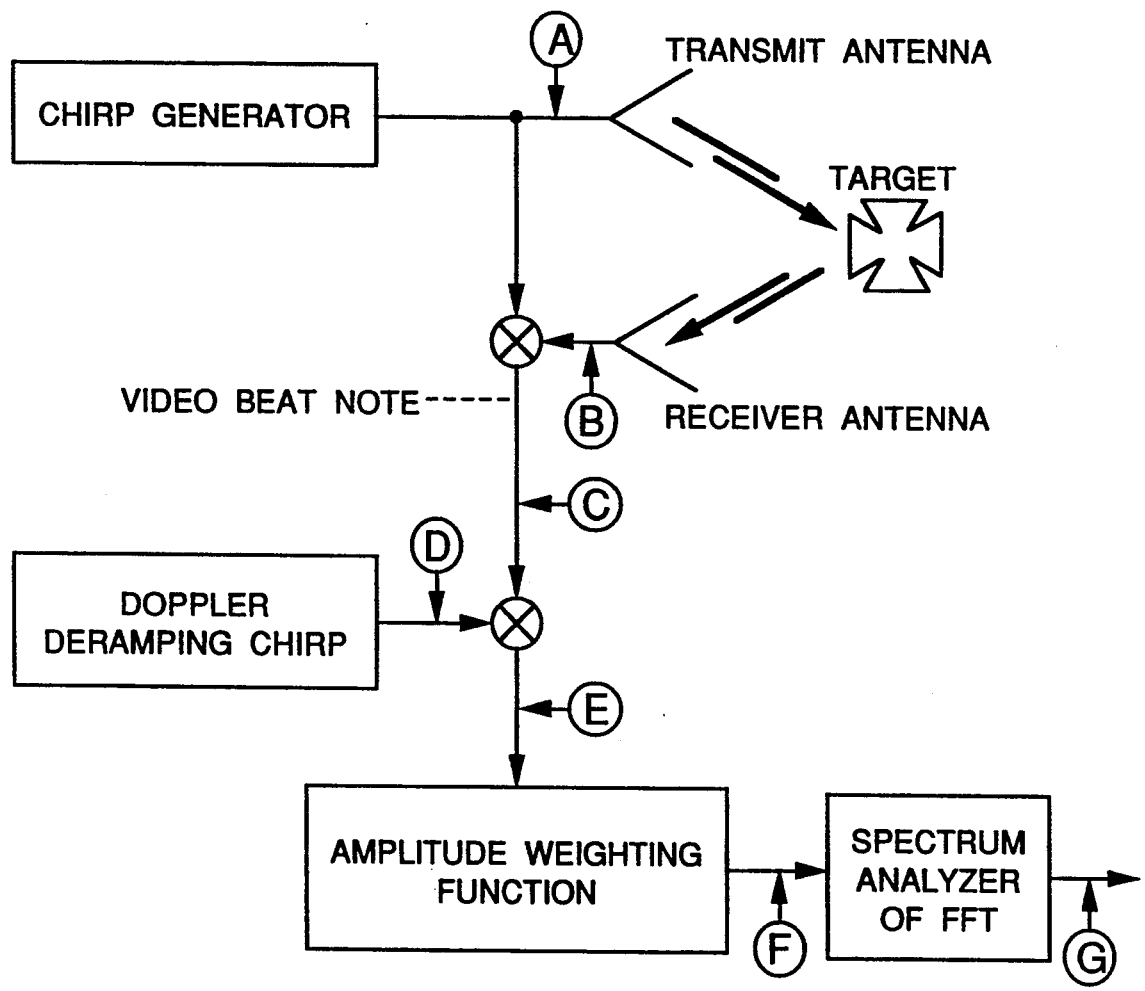
FIG. 8 is a block diagram of an FM-CW radar with a Doppler chirp compressor filter tuned to the corresponding target velocity.
Figure 9:
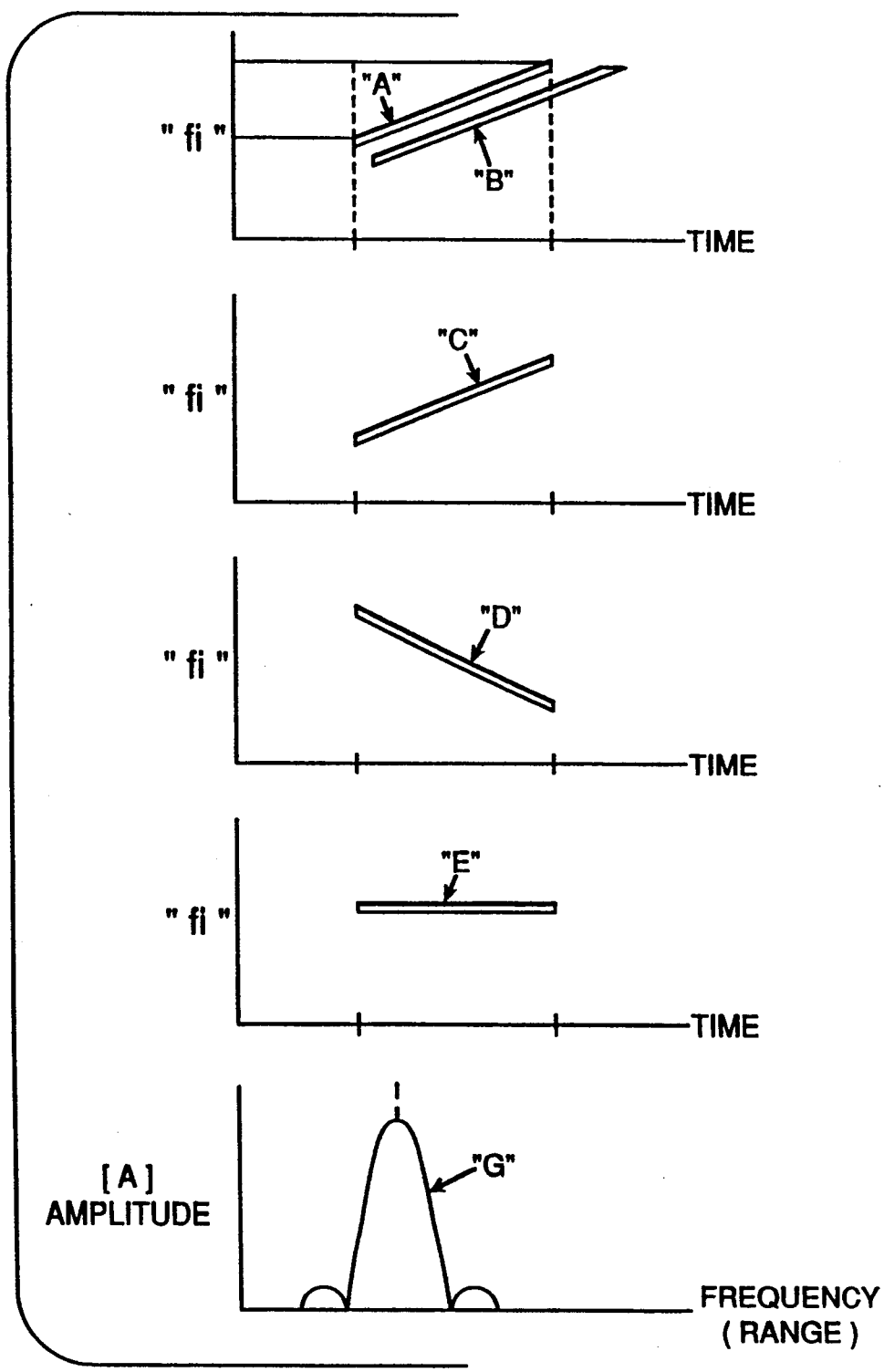
FIG. 9 is a chart of waveforms at various locations in the system of FIG. 8.

In conjunction with beamsteering, moving target compensation is performed on the video beat note as depicted in FIG. 8. The combined system block diagram is shown in FIG. 10.

The first mixer element 830 in FIG. 8 mixes the target return signal (from the receive antenna) with the transmitted signal (from the chirp) generator 800 to produce the baseband signal. More specifically, as shown in FIG. 1, the received frequency is subtracted from the transmitter frequency to yield constant beat frequency signal.

Figure 6:
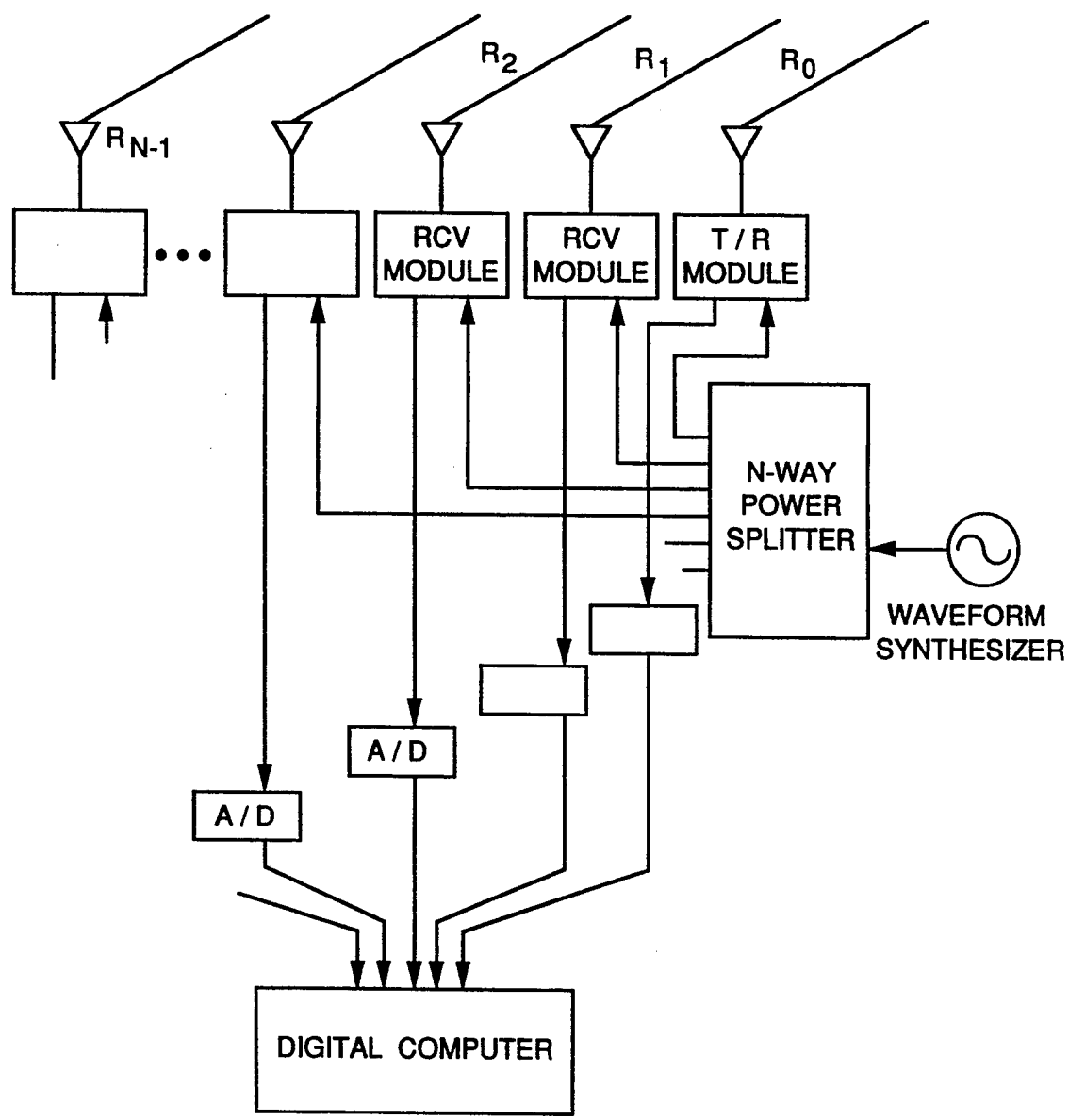
FIG. 6 is a block diagram of the ultra wide-band radar signal processor for electronically scanned arrays using distributed A/D converters and computer technology for signal processing.
Figure 7:
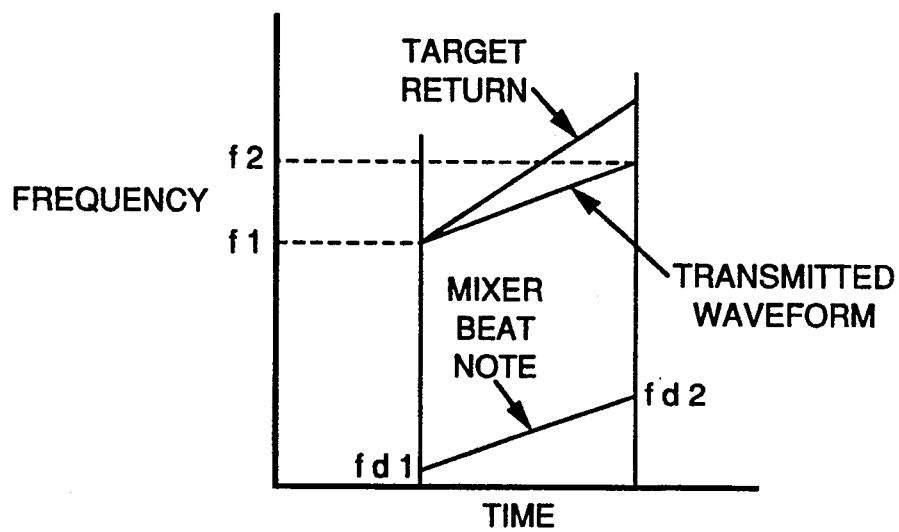
FIG. 7 is a chart of a mixer beat note for a moving target at zero range.
Figure 10:
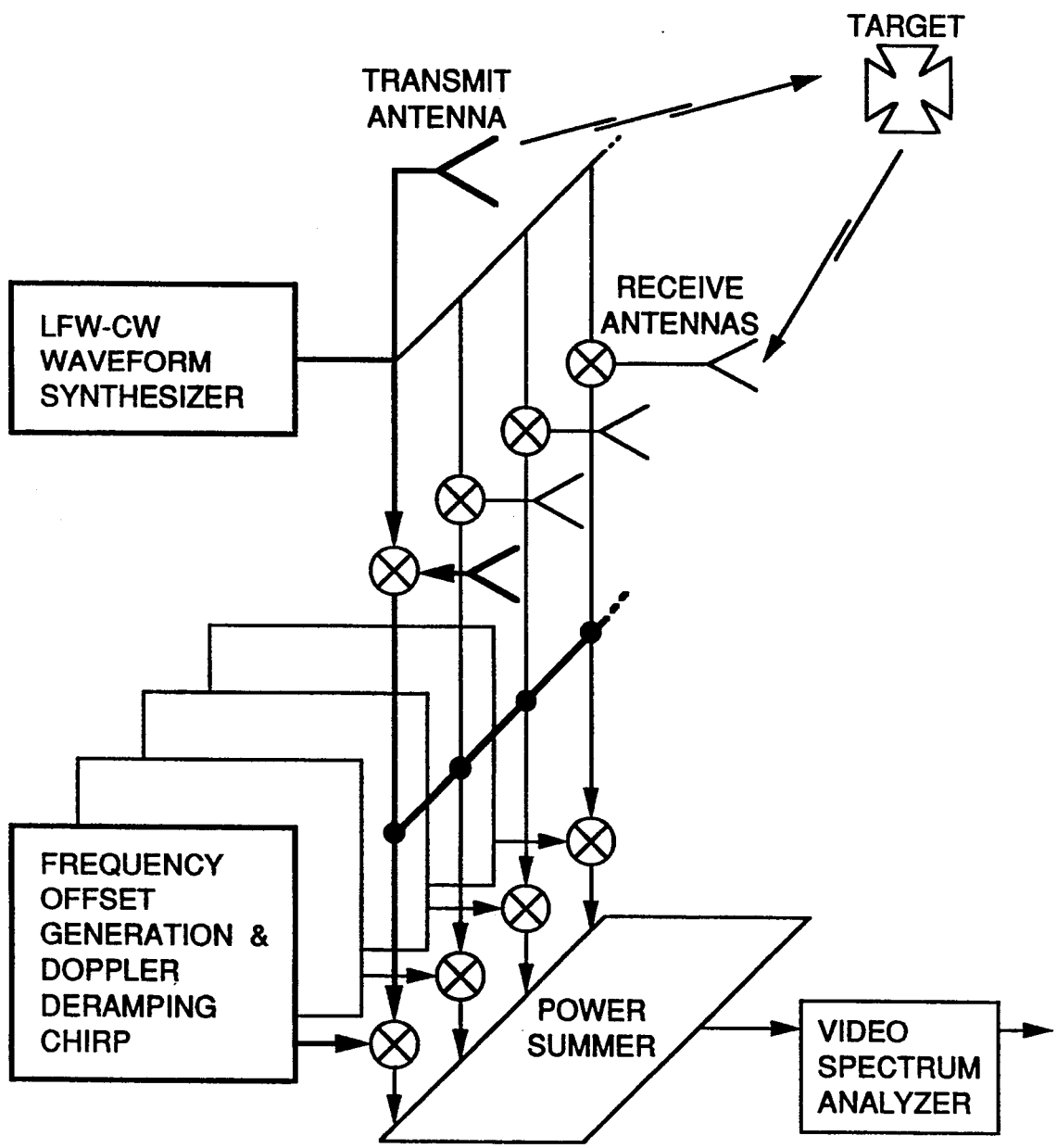
FIG. 10 is a simplified block diagram of an FM-CW radar with frequency offset generation and Doppler devamping chirp for surveillance tracking radar applications.
Figure 11:
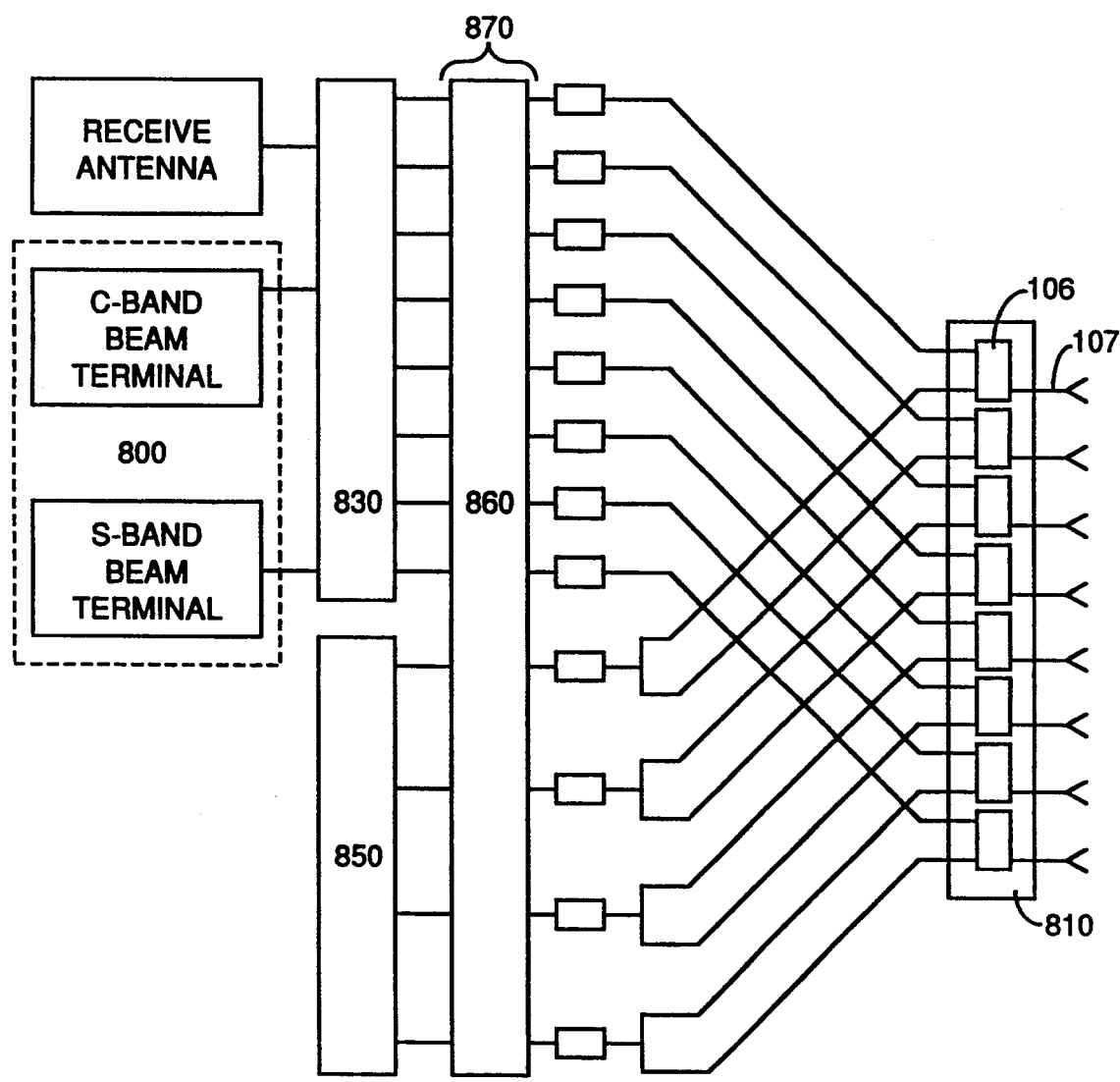
FIG. 11 is an illustration of a prior art ultra-wideband radar transmitter which can be used for the chirp generator and transmit antenna of the system of FIG. 10.

The constant beat frequency signal from the mixer 830 is mixed with the wideband Doppler deramping chirp waveform from unit (850) by a mixer (860) plurality of mixers (861-864 as depicted in FIG. 10) to provide the incremental frequency difference for each of the receive antenna elements. As discussed above, the incremental difference frequency is provided for each individual radiating element to steer the beam. Additionally, the amplitude weighting function 870 provides sidelobe suppression for the received signals appearing at the mixer outputs. Spectrum Analyzer (880) converts the beat frequency signals to amplitude as a function of range, which provides the input to data processor The present invention combines the advantages of ultra-wideband multioctave transmissions with frequency scanning to electronically steer the beam of the radar tracking system. Note that in FIGS. 3 the receive antenna and transmitting antenna have been depicted as separate antennas. If the system is a bistatic radar tracking system, two separate antennas will be used. In a monostatic radar system, one antenna unit will normally be used as both the transmitting antenna and the receive antenna, as depicted in FIG. 6. The digital computer shown in FIG. 6 may be used to digitally perform the functions of Doppler deramping and signal combining.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An ultra-wideband radar tracking system for tracking a moving target, said ultra-wideband radar tracking system comprising:

a multi-octave signal generator which generates an ultra-wideband chirped pulse signal, said ultra-wideband chirped pulse signal comprising a signal which is at least an octave in bandwidth;

a phased array antenna which is electrically connected with said multi-octave signal generator, said phased array antenna receiving said ultra-wideband chirped pulse signal from said multi-octave signal generator, and transmitting it into space, said phased array antenna having a plurality of radiating antenna elements;

a means for processing signals which is electrically connected to said phased array antenna, said signal processing means using frequency offset generation to electronically steer the ultra-wideband chirped pulse signal emitted by said phased array antenna, said signal processing means providing a frequency offset between said radiating antenna elements for said ultra-wideband chirped pulse signal to electrically steer the ultra-wideband chirped pulse signal by frequency offset mixing.

2. An ultra-wideband radar tracking system for tracking a moving target, said ultra-wideband radar tracking system comprising:

a multi-octave signal generator which generates an ultra-wideband chirped pulse signal, said ultra-wideband chirped pulse signal comprising a signal which is at least an octave in bandwidth;

a phased array antenna which is electrically connected with said multi-octave signal generator, said phased array antenna receiving said ultra-wideband chirped pulse signal from said multi-octave signal generator, and transmitting it into space, said phased array antenna having a plurality of radiating antenna elements which receives a doppler shifted chirped pulse signal from said moving target;

a means for producing a baseband signal with a video beat note, said producing means being electrically connected with said multi-octave signal generator in order to receive and mix said ultra-wideband chirped pulse signal with said doppler shifted chirped pulse signal;

a means for generating a plurality Doppler deramping chirp signals which when mixed with said baseband signal, provides an individual frequency offset for each of the antenna elements in the phased array antenna; and a means for mixing said baseband signal with each of said plurality of Doppler deramping chirp signals to produce thereby a plurality of frequency-steered signals which collectively represent said ultra-wideband chirped pulse signal with said frequency offset included therein.

3. An ultra-wideband radar tracking system for tracking a moving target, said ultra-wideband radar tracking system comprising:

a multi-octave signal generator which generates an ultra-wideband chirped pulse signal;

a phased array transmitting antenna which is electrically connected with said multi-octave signal generator, said phased array transmitting antenna receiving said ultra-wideband chirped pulse signal from said multi-octave signal generator, and transmitting it into space, said phased array transmitting antenna having a plurality of radiating antenna elements;

a receiving antenna for receiving a Doppler-shifted chirped pulse as said target-echo return signal is reflected from said moving target, said receiving antenna outputting said Doppler-shifted chirped pulse; and a means for processing signals which is electrically connected to said receiving antenna, said signal processing means using frequency offset generation to electronically steer the ultra-wideband chirped pulse signal emitted by said phased array transmitting antenna.

4. An ultra-wideband radar tracking system for tracking a moving target, said ultra-wideband radar tracking system comprising:

a multi-octave signal generator which generates an ultra-wideband chirped pulse signal, said ultra-wideband chirped pulse comprising a signal which is at least an octave in bandwidth;

a phased array transmitting antenna which is electrically connected with said multi-octave signal generator, said phased array transmitting antenna receiving said ultra-wideband chirped pulse signal from said multi-octave signal generator, and transmitting it into space, said phased array transmitting antenna having a plurality of radiating antenna elements;

a receiving antenna for receiving a Doppler-shifted chirped pulse as said target-echo return signal is reflected from said moving target, said receiving antenna outputting said Dopplar-shifted chirped pulse;

a means for producing a baseband signal with a video beat note, said producing means being electrically connected with said multi-octave signal generator in order to receive and mix said ultra-wideband chirped pulse signal with said Doppler-shifted chirped pulse;

a means for generating a plurality Doppler deramping chirp signals which when mixed with said baseband signal, provides an individual frequency offset for each of the antenna elements in the phased array transmitting antenna; and a means for mixing said baseband signal with each of said plurality of Doppler deramping chirp signals to produce thereby a plurality of frequency-steered signals which collectively represent said ultra-wideband chirped pulse signal with said frequency offset included therein.

* * * * *